No. 795,898. PATENTED AUG. 1, 1905.
O. CROSBY.
LUBRICATING DEVICE.
APPLICATION FILED APR. 11, 1904.
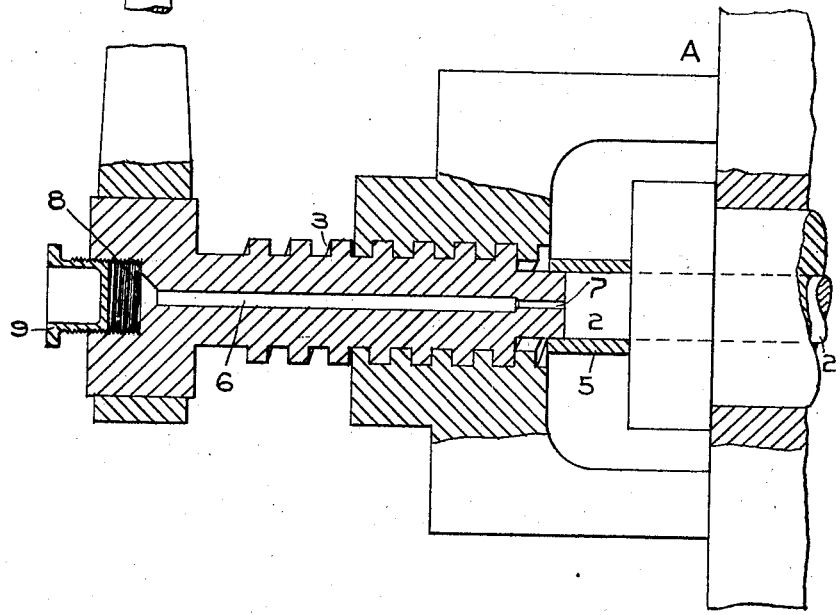
Witnesses,
W. H. Palmer
Emily F. Otis
Inventor,
Oliver Crosby
by Lothrop Johnson
his Attorneys.

UNITED STATES PATENT OFFICE.

OLIVER CROSBY, OF ST. PAUL, MINNESOTA.

LUBRICATING DEVICE.

No. 795,898. Specification of Letters Patent. Patented Aug. 1, 1905.

Application filed April 11, 1904. Serial No. 202,489.

*To all whom it may concern:*

Be it known that I, OLIVER CROSBY, a citizen of the United States, residing at St. Paul, in the county of Ramsey and State of Minnesota, have invented certain new and useful Improvements in Lubricating Devices, of which the following is a specification.

My invention relates to improvements in a patent granted to me on a friction-clutch, No. 425,989, issued April 22, 1890, its object being particularly to provide improved means for lubricating the actuating parts.

To this end my invention consists in the features of construction and combination hereinafter particularly described and claimed.

In the accompanying drawings, forming part of this specification, Figure 1 is a sectional view of a portion of my improved clutch, showing my invention; and Fig. 2 is an end elevation of Fig. 1.

In the drawings, A represents a portion of the framework of the clutch, the clutch itself not being shown.

2 represents a slidable rod by which the brakes are actuated. The slidable rod 2 is advanced by means of a screw 3, threaded in the end of the framework, and is provided with a suitable actuating-handle 4. The abutting ends of the screw and the slidable rod are preferably inclosed within a sleeve 5. In order to more satisfactorily lubricate the sliding rod, I form the screw with an axial opening 6, having a constricted inner end 7 and an enlarged outer end 8 to constitute a grease-holding cup. Within the enlarged end 8 is threaded a nut 9. By screwing the nut 9 inward the grease is forced through the opening 6 against the contacting faces of the screw and the slidable rod to lubricate said parts. The sleeve prevents the grease dropping from the ends of the screw and rod.

Having now described my invention, what I claim as new, and desire to secure by Letters Patent, is—

1. In combination a slidable rod, an actuating-screw engaging at its inner end with the outer end of said rod, said screw being provided with an axial opening having a constricted inner end and an enlarged outer end, and a nut threaded in the enlarged end of said opening for the purpose of forcing lubricant through said opening against the adjacent end of said rod.

2. In combination a slidable rod, an actuating-screw making contact at its inner end with the outer end of said rod, said screw being provided with an axial opening having an enlarged outer end, a sleeve surrounding the meeting ends of said screw and rod, and a nut threaded in the enlarged end of said opening for the purpose of forcing lubricant through said opening and against the adjacent end of said rod.

In testimony whereof I affix my signature in presence of two witnesses.

OLIVER CROSBY.

Witnesses:
R. S. GAISFORD,
O. W. MORTON.